United States Patent
Sherwani et al.

(10) Patent No.: US 11,707,684 B2
(45) Date of Patent: Jul. 25, 2023

(54) CROSS-PLATFORM CONSUMPTION OF IN-GAME OBJECTS

(71) Applicant: Sony Interactive Entertainment LLC, San Mateo, CA (US)

(72) Inventors: Adil Sherwani, Oakland, CA (US); Charles Wayne Denison, II, Piedmont, CA (US); Matthew Stewart Bloom-Carlin, San Francisco, CA (US); Derek Andrew Parker, San Francisco, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 16 days.

(21) Appl. No.: 16/661,243

(22) Filed: Oct. 23, 2019

(65) Prior Publication Data

US 2020/0129863 A1 Apr. 30, 2020

Related U.S. Application Data

(60) Provisional application No. 62/750,616, filed on Oct. 25, 2018.

(51) Int. Cl.
*A63F 13/73* (2014.01)
*A63F 13/58* (2014.01)
*A63F 13/35* (2014.01)

(52) U.S. Cl.
CPC .............. *A63F 13/73* (2014.09); *A63F 13/35* (2014.09); *A63F 13/58* (2014.09)

(58) Field of Classification Search
CPC ........... A63F 13/73; A63F 13/35; A63F 13/58
See application file for complete search history.

(56) References Cited

U.S. PATENT DOCUMENTS

| 1,131,838 A | 3/1915 | Hopkins et al. |
| 9,449,526 B1 | 9/2016 | Tseng et al. |

(Continued)

FOREIGN PATENT DOCUMENTS

| CN | 113260428 A | 8/2021 |
| CN | 113260434 A | 8/2021 |

(Continued)

OTHER PUBLICATIONS

"International Search Report" and "Written Opinion of the International Searching Authority," Patent Cooperation Treaty Application No. PCT/US2019/056892, dated Jan. 10, 2020, 8 pages.

(Continued)

*Primary Examiner* — William H McCulloch, Jr.
*Assistant Examiner* — Ankit B Doshi
(74) *Attorney, Agent, or Firm* — Carr & Ferrell LLP

(57) ABSTRACT

Computer implemented systems and methods for cross-platform consumption of in-game objects are provided herein. An exemplary method includes receiving by a data platform from at least one first device game object data discovered by a user while playing a video game associated with the data platform; attributing by the data platform a cross-platform identifier to the game object data; storing by the data platform metadata associated with the game object data to a database associated with the data platform, and receiving by the data platform from a second device associated with the data platform a request for access to the game object data and the metadata. The request may include the cross-platform identifier. The exemplary method further includes authenticating by the data platform the request based on the cross-platform identifier; and based on the authentication selectively providing by the data platform access to game object data and the metadata.

22 Claims, 6 Drawing Sheets

(56) References Cited

U.S. PATENT DOCUMENTS

| | | | |
|---|---|---|---|
| 10,142,204 B2 | 11/2018 | Nickolov et al. | |
| 11,245,776 B2 | 2/2022 | Sherwani et al. | |
| 2003/0009549 A1 | 1/2003 | Maehiro | |
| 2003/0047874 A1 | 3/2003 | Leen et al. | |
| 2003/0100375 A1 | 5/2003 | Wakae | |
| 2004/0093515 A1 | 5/2004 | Reeves, Jr. | |
| 2006/0121991 A1 | 6/2006 | Borinik et al. | |
| 2008/0268947 A1* | 10/2008 | Fyock | A63F 13/352 463/29 |
| 2009/0098980 A1 | 4/2009 | Waters | |
| 2009/0264202 A1 | 10/2009 | Chen et al. | |
| 2010/0119215 A1 | 5/2010 | Chien et al. | |
| 2011/0281648 A1* | 11/2011 | Weising | A63F 13/5372 463/32 |
| 2012/0072941 A1 | 3/2012 | Thornberry et al. | |
| 2012/0081306 A1* | 4/2012 | Sirpal | G06F 3/04883 345/173 |
| 2013/0045803 A1 | 2/2013 | Kang et al. | |
| 2013/0227086 A1 | 8/2013 | Stout | |
| 2013/0325954 A1 | 12/2013 | Cupala et al. | |
| 2014/0101244 A1 | 4/2014 | Klein et al. | |
| 2014/0181197 A1 | 6/2014 | Baggott | |
| 2014/0214980 A1 | 7/2014 | Jung | |
| 2014/0278686 A1 | 9/2014 | Mullings et al. | |
| 2014/0297260 A1 | 10/2014 | Allen | |
| 2014/0297798 A1 | 10/2014 | Bakalash et al. | |
| 2014/0349749 A1 | 11/2014 | Nogami et al. | |
| 2015/0005052 A1 | 1/2015 | Harrington | |
| 2015/0005065 A1 | 1/2015 | Mizuki et al. | |
| 2015/0007014 A1 | 1/2015 | Allen | |
| 2016/0149956 A1 | 5/2016 | Birnbaum et al. | |
| 2016/0191999 A1 | 6/2016 | Friedrich | |
| 2017/0136367 A1 | 5/2017 | Watari et al. | |
| 2017/0259177 A1 | 9/2017 | Aghdaie et al. | |
| 2017/0333789 A1 | 11/2017 | Shepard et al. | |
| 2018/0152758 A1 | 5/2018 | Miller | |
| 2018/0152759 A1 | 5/2018 | Miller | |
| 2018/0243656 A1 | 8/2018 | Aghdaie | |
| 2018/0290053 A1 | 10/2018 | Zhang et al. | |
| 2018/0373689 A1 | 12/2018 | Haynes et al. | |
| 2019/0253757 A1 | 8/2019 | Leister | |
| 2019/0291010 A1 | 9/2019 | Benedetto et al. | |
| 2020/0122041 A1 | 4/2020 | Sherwani et al. | |
| 2020/0128100 A1 | 4/2020 | Sherwani et al. | |

FOREIGN PATENT DOCUMENTS

| | | |
|---|---|---|
| EP | 1923110 A1 | 5/2008 |
| JP | 2007267173 A | 11/2007 |
| JP | 2008125678 A | 6/2008 |
| JP | 2013528432 | 7/2013 |
| JP | 2018042901 A | 3/2018 |
| JP | 2018108444 A | 7/2018 |
| WO | WO2014094110 A1 | 6/2014 |
| WO | WO-2017121768 A1 * | 7/2017 |
| WO | WO2017121768 A1 | 7/2017 |
| WO | WO2020086337 A1 | 4/2020 |
| WO | WO2020086393 A1 | 4/2020 |
| WO | WO2020086666 A1 | 4/2020 |

OTHER PUBLICATIONS

"International Search Report" and "Written Opinion of the International Searching Authority," Patent Cooperation Treaty Application No. PCT/US2019/057570, dated Jan. 14, 2020, 11 pages.

"International Search Report" and "Written Opinion of the International Searching Authority," Patent Cooperation Treaty Application No. PCT/US2019/056338, dated Jan. 14, 2020, 9 pages.

WPTEQ, "Xbox One, Snap Mode to be discontinued? It could be a new multitasking [Google Translation]," [online], Dec. 1, 2016, [Date of Search: May 30, 2022], <URL: https://wpteq.org/xbox/xbox-games/post-21127/>, 10 pages (19 with Translation).

* cited by examiner

400

Earth Elemental

Earth elementals are made of mud, clay, sand and rock dust clumped together with water and brought alive with magic.

CROSS-PLATFORM CONSUMPTION OF IN-GAME OBJECTS

CROSS REFERENCE TO RELATED APPLICATION

This application claims the benefit of U.S. Provisional Application No. 62/750,616, filed on Oct. 25, 2018.

FIELD

The present technology relates generally to remote networked game services, and more particularly to systems and methods for cross-platform consumption of in-game objects.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Video games are getting more complex, while the time allotted to play them is more limited than ever. Players want to stay engaged and immersed in the video games that they play, from start to finish. However, these players often have questions about the game that they are playing, and to get answers to these questions, they have to leave the game and engage with third party sites. This is because in-game states and video game activities are not aggregated and analyzed across video games and video game players. It would be a colossal amount of work for a game developer to implement all the features necessary to provide the player help with the game and to reduce player frustration within the context of a single game. Therefore, a data model and developer-friendly API is needed to support multiple players and gaming environments across a uniform data platform.

Moreover, players who are deeply invested and immersed in a game world can be very passionate about consuming all the lore that the game developer has to offer in and around that world, to increase their immersion in and understanding of the game world and its characters. However, it can be quite challenging to keep track of all the discovered lore, and to determine which lore has yet to be discovered. Additionally, in most games, the consumption of the lore must take place in-game, often requiring the player to pause the game action in order to consume that lore via cut scene, an audio-log, an in-game book, and so forth. In terms of how they spend their scarce and valuable playtime, this can force the player to choose between continuing game action and discovering lore.

Thus, there is a long-felt need for methods that allow players to review or consume the lore that they have discovered while playing video games without interrupting the players' participation in the interactive video game environment.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure refers to cross-platform consumption of in-game objects discovered while playing a video game. The technology disclosed here allows consumption or review of the in-game objects (also referred to as "game lore," or simply "lore") at a platform level across multiple games and/or devices associated with a data platform.

According to one example embodiment of the present disclosure, a computer-implemented system for cross-platform consumption of in-game objects is provided. The system can include a data platform configured to receive, from at least one first device, game object data discovered by at least one user while playing a video game associated with the data platform; attribute, by the data platform, a cross-platform identifier to the game object data, the cross-platform identifier being associated with the user; store, by the data platform, metadata associated with the game object data to a database associated with the data platform, the metadata indicative that the user has discovered one or more game objects; receive, by the data platform from a second device associated with the data platform, a request for access to the game object data and the metadata, the request including the cross-platform identifier; authenticate, by the data platform, the request based on the cross-platform identifier; and, based on the authentication, selectively provide, by the data platform, access to game object data and the metadata.

The system can also include a database configured to store the metadata associated with the game object data associated with data platform. The one or more game objects can include a state of the video game, a progression of the video game, text, an image, a book, an audio book, an audiolog, and a video clip. The game object data can be consumed in an out-of-game environment. Discovery of the game object data can include at least one of the following: encountering a new character or creature, collecting an artifact or item, identifying a weakness of an enemy, hearing information from a non-player character (NPC), watching a cut scene, progressing to a next stage of the game, locating a previously undiscovered area, choosing one of a plurality of story branches. The device that the game is played on can include a game console, a mobile device, a desktop computer, a laptop computer, a table, phablet, and a smart TV. Upon discovering game object data, the game object data can be reviewed or consumed via a second device that may be the same or a different device from the first device. The video game can include a multiplayer game, a Player vs. Environment (PvE) game, or a cooperative PvE game. The game object data can be discovered while interacting with a plurality of video games associated with the data platform. The game object data can be reviewed or consumed in snap mode. The snap mode can include a picture-in-picture mode, a dual screen mode, or a different device.

According to another example embodiment of the disclosure, a method or cross-platform consumption of in-game objects is provided. The method can include receiving, by a data platform, from at least one first device, game object data discovered by a while playing a video game associated with the data platform; attributing, by the data platform, a cross-platform identifier to the game object data, the cross-platform identifier being associated with the user; storing, by the data platform, metadata associated with the game object data to a database associated with the data platform, the metadata indicative that the user has discovered one or more game objects; receiving, by the data platform from a second device associated with the data platform, a request for access to the game object data and the metadata, the request including the cross-platform identifier; authenticating, by the data platform, the request based on the cross-platform identifier; and based on the authentication, selectively providing, by the data platform, access to game object data and the metadata.

The method can further include generating a user interface based on the game object data and the metadata. The user interface may include at least one game object that the user has discovered. The user interface can be selectively filtered based on one or more of the following: a type of game object, a related in-game entity, a related in-game activity, a discovered status, a video game from which the game object is from, and an unviewed status. Moreover, the user interface can display the at least one game object in a chronological order in which the at least one game object was discovered. The user interface may further include a place holder for at least one game object that the user has not discovered. In various embodiments, the method may include updating previously stored metadata with newly discovered information. In certain embodiments, the metadata associated with certain game objects is marked as always unlocked. The method may further include receiving a request for help regarding discovering a game object, and in response to receiving the request, may include launching a help system with the game object selected. In addition, the game object data may be reviewed or consumed in a snap-mode, the snap-mode including a picture in picture, a dual screen, or a further device.

According to another example embodiment of the present disclosure, the steps of the method for cross-platform consumption of in-game objects is stored on a non-transitory machine-readable medium comprising instructions, which when implemented by one or more processors perform the recited steps.

Other example embodiments of the disclosure and aspects will become apparent from the following description taken in conjunction with the following drawings.

BRIEF DESCRIPTION OF THE DRAWINGS

Embodiments are illustrated by way of example, and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

The technology disclosed herein allows users (e.g., game players) to track and consume the game lore they unlock via an out-of-game platform experience, so that they can consume the lore anytime and anywhere (including off-console), and so that they can keep track of lore items that remain unlocked. Video games offer rich lore content in the form of cut scenes, audio logs, in-game books, in-game journal entries, and so forth. Unlocking the lore can directly impact gameplay and provide helpful context to the gameplay (e.g., provide a backstory of the video game). The users may want to engage with this content, but not at the expense of interrupting their game action.

The technology disclosed here allows users to consume this content when they are away from their console, so that they can focus their console time on active gameplay while still being able to deeply immerse themselves into the game world. According to the present disclosure, users may discover game objects while playing a video game on the web or via a mobile application. A uniform data platform can track the collected game objects and show previously unlocked game objects, if the game objects are relevant to the activity of the user.

Figure 1:
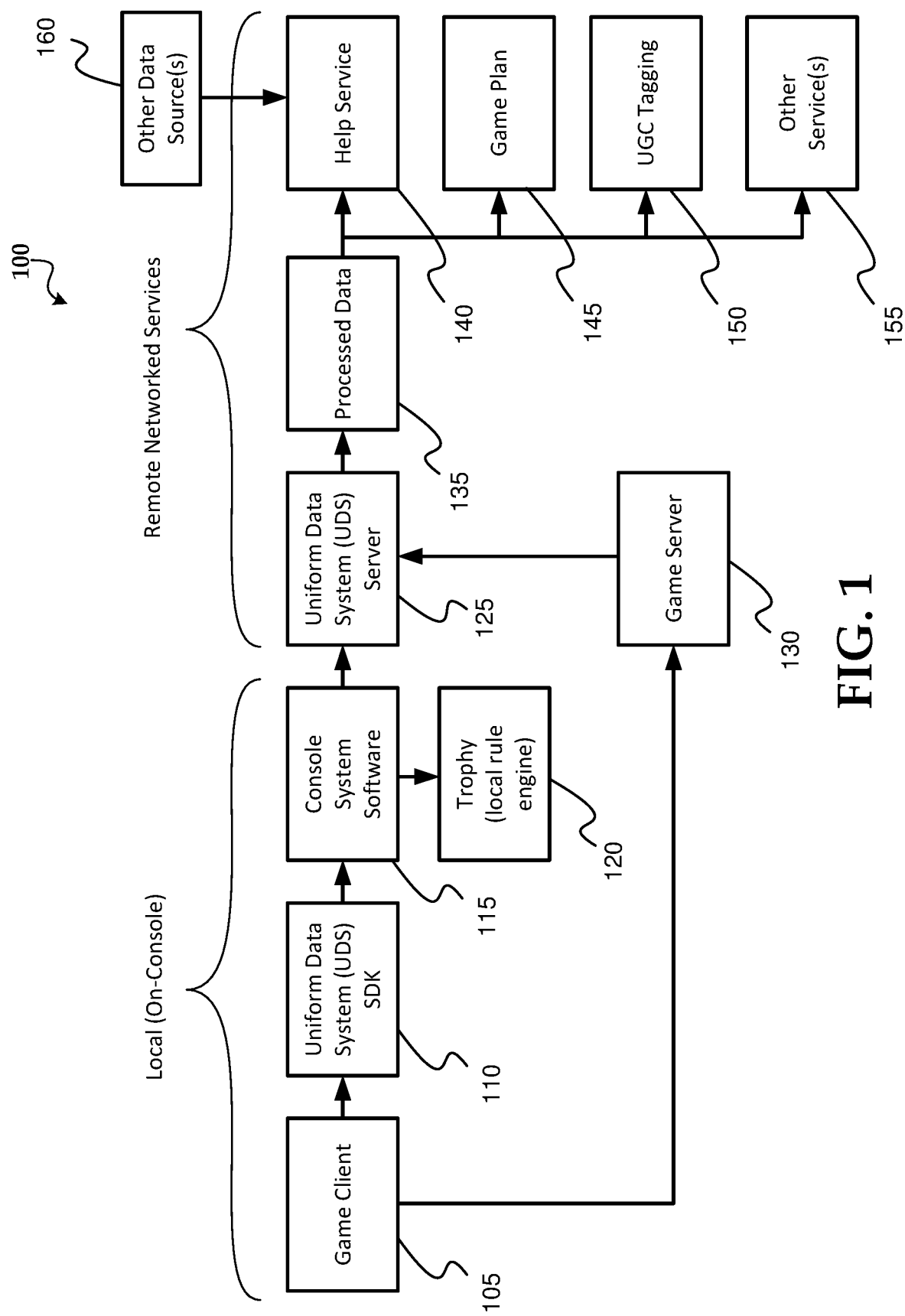
FIG. 1 shows an exemplary system architecture for providing users with contextual information regarding available game activities, according to one example embodiment.

FIG. 1 is an exemplary system architecture 100 for providing users with contextual information regarding available game activities, according to one example embodiment. In some embodiments, the exemplary system architecture 100 includes a game client 105, a uniform data system (UDS) software development kit (SDK) 110, console system software 115, a local rule engine 120, a UDS server 125, a game server 130, processed data 135, and one or more other remote networked services, including a help service 140, game plan 145, user generated content (UGC) tagging 150, and other service(s) 155. The help service 140 may also receive information from other data source(s) 160.

The game client 105 and game server 130 provide contextual information regarding a plurality of applications to a uniform data system (UDS) server 125 via a UDS data model describing the logical structure of UDS data used by the UDS SDK 110. The UDS data model enables the platform to realize remote networked services, such as the help service 140, game plan 145, UGC tagging 150, and other service(s) 155 that require game data, without requiring each game to be patched separately to support each service. The UDS data model assigns contextual information to each portion of information in a unified manner across games. The contextual information from the game client 105 and UDS SDK 110 is provided to the UDS server 125 via the console system software 115. It is to be understood that the game client 105, UDS SDK 110, console system software 115, and local rule engine 120 may run on a computer or other suitable hardware for executing a plurality of applications.

The UDS server 125 receives and stores contextual information from the game client 105 and game server 130 from a plurality of applications. To be sure, the UDS server 125 may receive contextual information from a plurality of game clients and game servers for multiple users. The information may be uniformly processed 135 and then received by the plurality of remote networked services 140, 145, 150, and 155.

Figure 2:
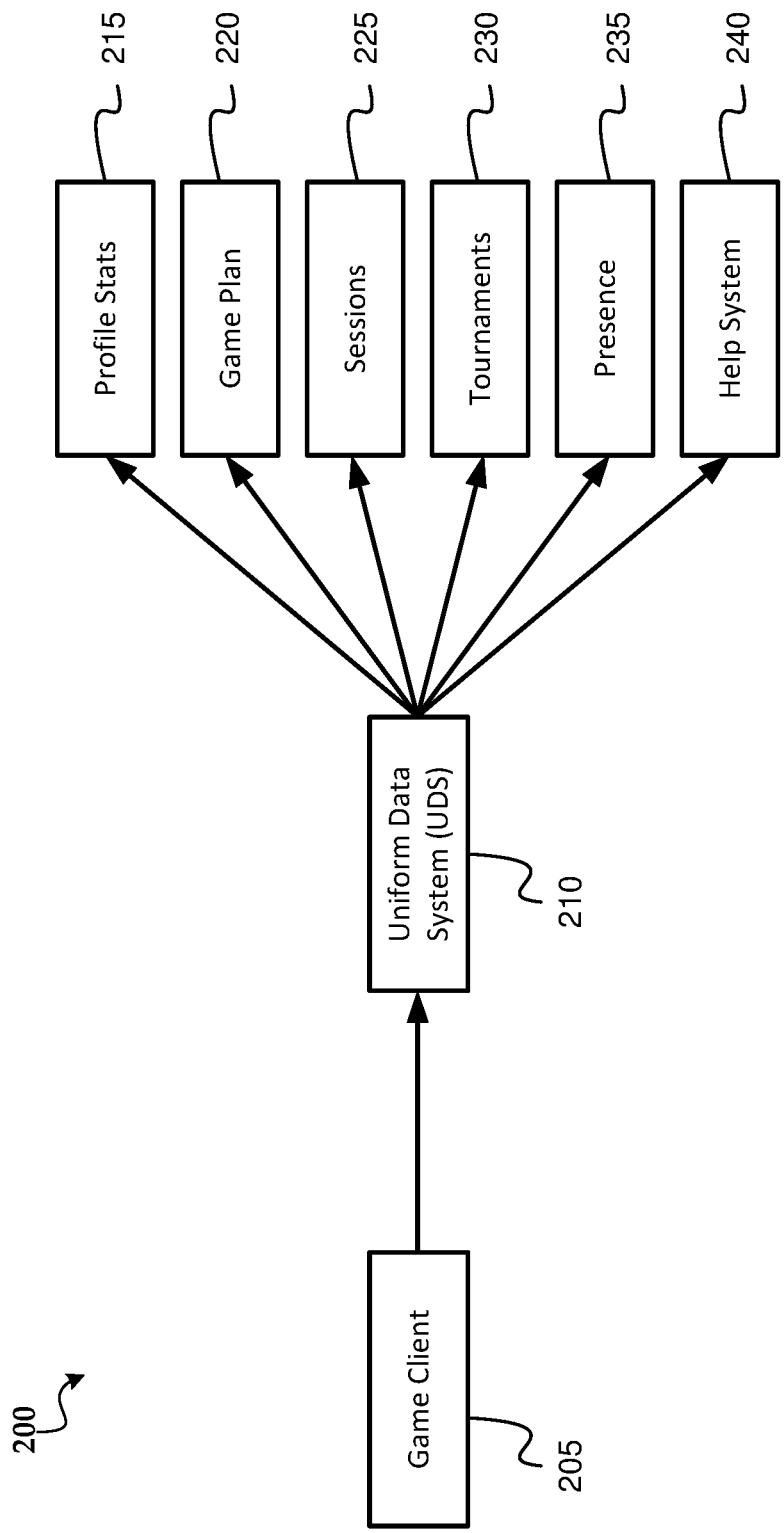
FIG. 2 illustrates another exemplary system architecture, according to one example embodiment.

FIG. 2 shows another exemplary embodiment of a system architecture according to the present disclosure. A game client 205 sends contextual information to a UDS server 210, which provides the contextual information in a unified data model to a plurality of remote networked services, including profile stats 215, game plan 220, sessions 225, tournaments 230, presence 235, and help system 240.

Figure 3:
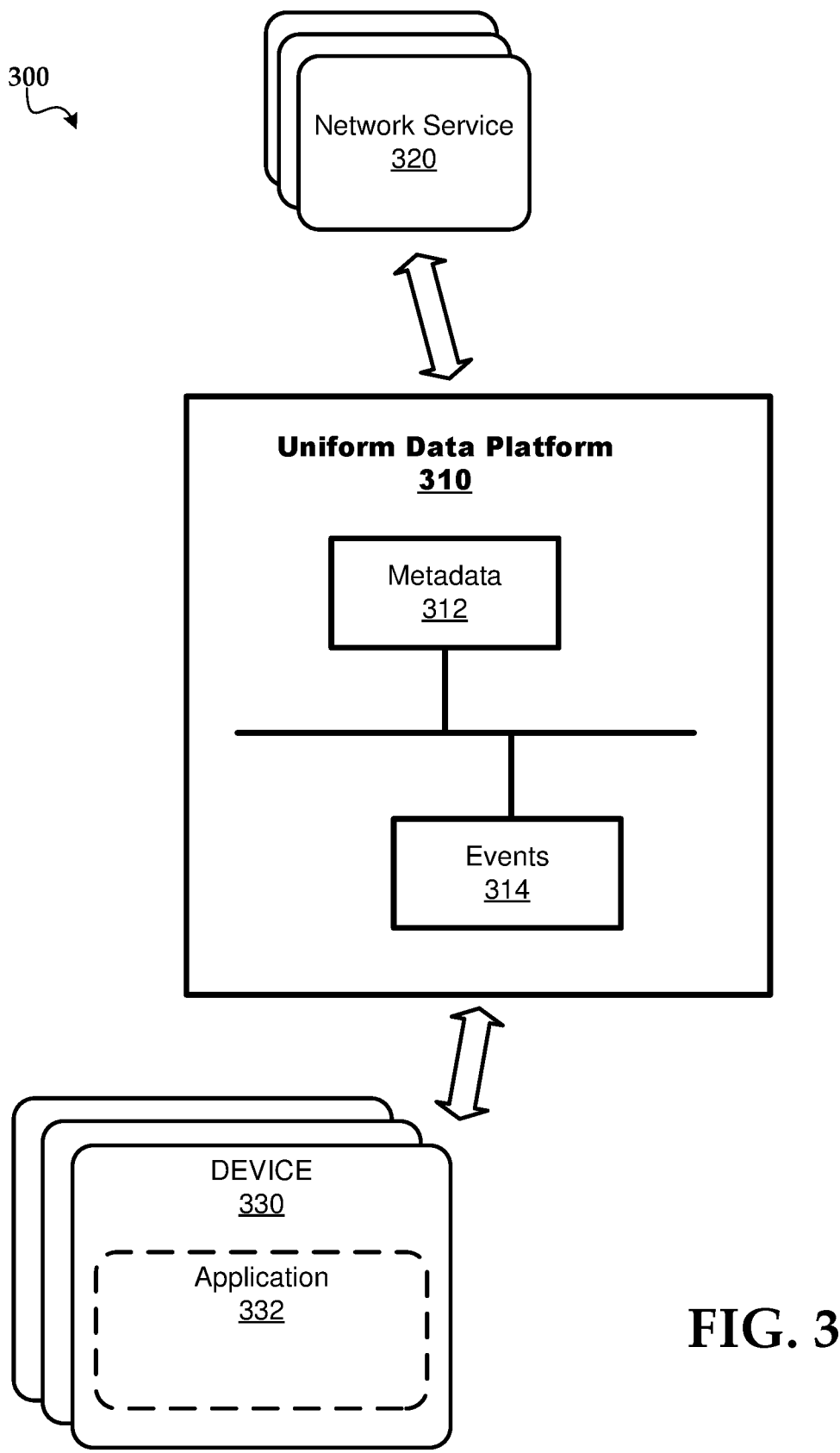
FIG. 3 shows an exemplary system for providing a data model for a uniform data platform, according to one example embodiment.

FIG. 3 illustrates an exemplary system 300 for providing a data model for a uniform data platform 310, according to an example embodiment of the disclosure. In one example embodiment, system 300 can include at least one device 330 configured to execute at least one of a plurality of applications 332, each application having an application data structure. A uniform data platform 310 can be executed on one or more servers. The uniform data platform 310 can include a data model which is uniform across the plurality of application data structures. The data model can include metadata 312 corresponding to at least one object indicated in the data model, and events 314 corresponding to a trigger condition associated with at least one metadata entry. The values of the metadata 312 and events 314 can be associated with a user profile. The uniform data platform 310 can be configured to receive application data from the at least one device 330 and store the application data within the data model. The system 300 can also include a plurality of remote networked services 320 configured to access the application data from the uniform data platform 310 using the data model.

In various embodiments, the metadata 312 may include: a list of all activities that a user can do in an application, an activity name, a description of the activity, a state of the activity (whether available, started, or completed), whether the activity is required to complete an objective or campaign, a completion reward for the activity, an intro or outro cut scene, an in-game location, one or more conditions that must be met before the activity becomes available, and a parent activity that contains the activity as a sub-activity. Metadata 312 may further include: a list of abilities exercisable by the user, effects of each action, telemetry indicative of when actions and effects take place including corresponding timestamps and locations, an in-game coordinate system, a list of in-game branch situations, and telemetry indicative of when a branch situation is encountered and which option is selected by the user. A list of in-game statistics, items, lore, in-game zones and corresponding attributes regarding each statistic, item, lore, or zone may likewise be included in the metadata 312. In addition, the metadata 312 may indicate whether or not a particular activity, entity (such as a character, item, ability, etc.), setting, outcome, action, effect, location, or attribute should be marked as hidden.

Events 314 may be fired in response to several various trigger conditions. For example, such trigger conditions may include: an activity that was previously unavailable becomes available, a user starts an activity, a user ends an activity, an opening or ending cut scene for an activity begins or ends, the user's in-game location or zone changes, an in-game statistic changes, an item or lore is acquired, an action is performed, an effect occurs, the user interacts with a character, item, or other in-game entity, and an activity, entity, setting, outcome, action, effect, location, or attribute is discovered. The events 314 may include further information regarding a state of the application when the events 314 were triggered, for example a timestamp, a difficulty setting and character statistics at the time a user starts or ends an activity, success or failure of an activity, or a score or duration of time associated with a completed activity.

Figure 4:
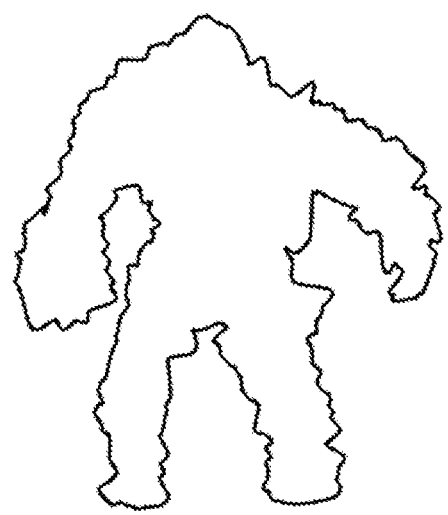
FIG. 4 shows an exemplary game object, according to one example embodiment.

FIG. 4 illustrates an exemplary game object 400, according to an example embodiment of the disclosure. The game object (also referred to as "game lore," or as simply, "lore") can include an object a user discovers while playing a video game. The game object can provide valuable information about the game world and include a state of the video game, a progression of the video game, text, an image, a book, an audio book, an audiolog, or a video clip. In response to the user discovering a game object, the game client may send a request or notification to the UDS server indicating that the user has discovered the game object. The UDS server may then update metadata associated with the game object and the user, indicating that the user has discovered, or otherwise unlocked, the game object.

In one or more embodiments, the information displayed also includes out-of-game media that relates to the game or the particular game object, such as concept art for a game character, developer commentary on a game level, etc. It is to be understood that, in response to the related game object being discovered or otherwise unlocked, the related out-of-game media may also be discovered or otherwise unlocked. The out-of-game media may be stored at the UDS server, or any other suitable server or third-party repository. The server or repository may be queried when the information is needed so the most up-to-date out-of-game media available regarding the game object is presented.

It is to be understood that there are various ways in which a user may discover a game object during gameplay. For example, the user may encounter a new character or creature, collect an artifact or item, identify a weakness of an enemy, hear information from a non-player character (NPC), watch a cut scene, progress to a next stage of the game, locate a previously undiscovered area, choose one of a plurality of story branches, and the like. Alternatively, certain game objects may be manually marked by a developer as always unlocked, which allows any user to consume the lore even before playing the game. Discovering a game object may also trigger an update of an existing piece of lore, as opposed to unlocking a new piece of lore. For example, the user may gradually learn more about an NPC's backstory over the course of a game. In response to discovering more information regarding the NPC, an unlock event may update a piece of lore associated with that in-game entity instead of adding new piecemeal entries for each piece of backstory.

Moreover, each game object may be associated with one or more related entities. For instance, a particular cut scene may pertain to various characters or items, each of which would be listed as a related entity for the cut scene game object. Each game object may also indicate which in-game activity the game object was acquired in.

As shown in FIG. 4, unlocking the Earth Elemental (a character) game object can provide valuable information about the character. While this information is valuable, it can also be consumed by a user at a later time, in an out-of-game environment, without impacting the ability of the user to play the interactive game. Allowing the user to review and consume the information associated with this character at the platform level (on and off console) as well as all of other in-game lore they have discovered so far across the games associated with the platform, provide the user with the ability to focus on interactive gameplay rather than on consuming passive media.

In various embodiments, a user interface comprises each game object that a user has discovered across one or more games associated with the platform. The user may access and consume each available piece of lore via the user interface in an in-game environment or an out-of-game environment, either via the game client or a separate device. In certain embodiments, the discovered game objects, regardless of which game each game object is associated with, may be displayed in a chronological order in which the lore was discovered. In this way, the user has immediate access to all related recent user activity. Alternatively, the discovered game objects may be displayed by associated game title. The user may efficiently manage and view his or her discovered game objects by indicating a subset of game objects to view. The subset may be defined by an in-game activity in which the game objects were discovered, an in-game entity for which the game objects are related, a type of game object (e.g. an audio log, cut scene, book, etc.), an unread or unviewed status, or a discovered status of the game object.

The technology can also allow users to determine how many pieces of lore they have not yet discovered for each section of the game, so that the users can continue looking for lore until they are done playing and experience the full extent of content that the game has to offer. Furthermore, the user may request help toward acquiring undiscovered lore via a help option. In response to receiving a request for help regarding a particular piece of lore, the data platform may launch a help system with the particular identified piece of lore selected. The game objects can be accessed cross-platform for all games associated with the data platform remotely and off-line.

In a further embodiment, in response to the user interacting with an in-game entity, the game client may display to the user a list of discovered lore that relates to the in-game entity. The game client may present the discovered lore via a user interface in a snap-mode, overlay, or other suitable mode.

It is to be understood that the game lore accessible to a user may be associated with a particular user account or user profile, such that each user is presented with a user interface customized based on which in-game objects that they have discovered or not discovered.

Figure 5:
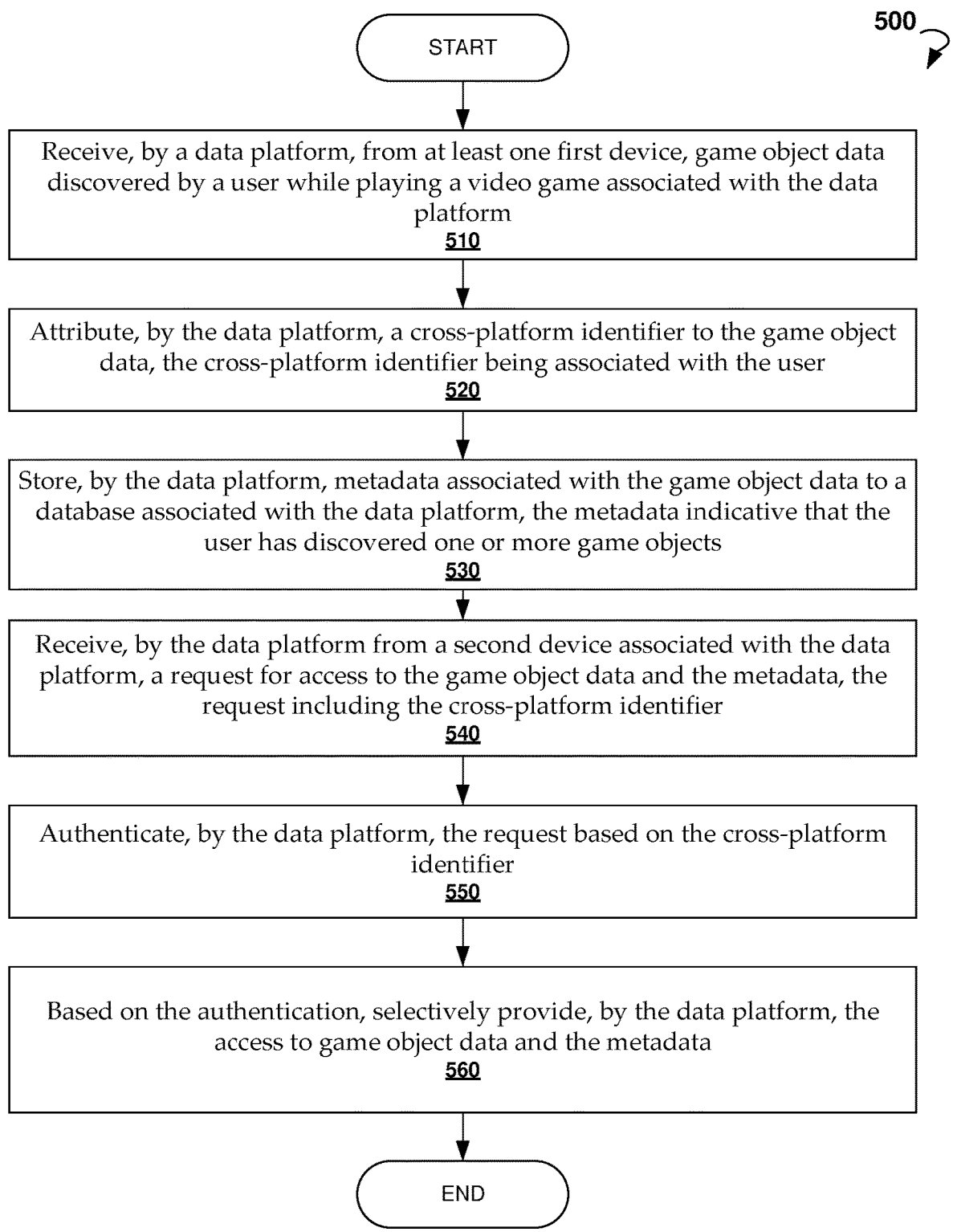
FIG. 5 illustrates a flow diagram of a method for cross-platform consumption of in-game objects, according to one example embodiment.

FIG. 5 is a process flow diagram showing a method 500 for cross-platform consumption of in-game objects. Method 500 can be performed by processing logic that includes hardware (e.g., decision-making logic, dedicated logic, programmable logic, application-specific integrated circuit), software (such as software run on a general-purpose computer system or a dedicated machine), or a combination of both. In example embodiments, the processing logic refers to one or more elements of the system architecture 100 and 200 of FIGS. 1 and 2, respectively. Operations of method 500 recited below can be implemented in an order different than the order described and shown in the figure. Moreover, method 500 may have additional operations not shown herein, but which can be evident from the disclosure to those skilled in the art. Method 500 may also have fewer operations than shown in FIG. 5 and described below.

According to one example embodiment of the disclosure, a method for cross-platform consumption of in-game objects 500 can commence in operation 510 with receiving, by a data platform, from at least one first device, game object data discovered by a user while playing a video game associated with the data platform.

In operation 520, method 500 can proceed with attributing, by the data platform, a cross-platform identifier to the game object data, the cross-platform identifier being associated with the user. In operation 530, method 500 can store, by the data platform, metadata associated with the game object data to a database associated with the data platform, the metadata indicative that the user has discovered one or more game objects. In operation 540, method 500 can receive, by the data platform from a second device associated with the data platform, a request to access the game object data and the metadata, the request including the cross-platform identifier. In operation 550, method 500 can authenticate, by the data platform, the request based on the cross-platform identifier. In operation 560, method 500 can selectively provide, by the data platform, the access to game object data and the metadata based on the authentication.

Figure 6:
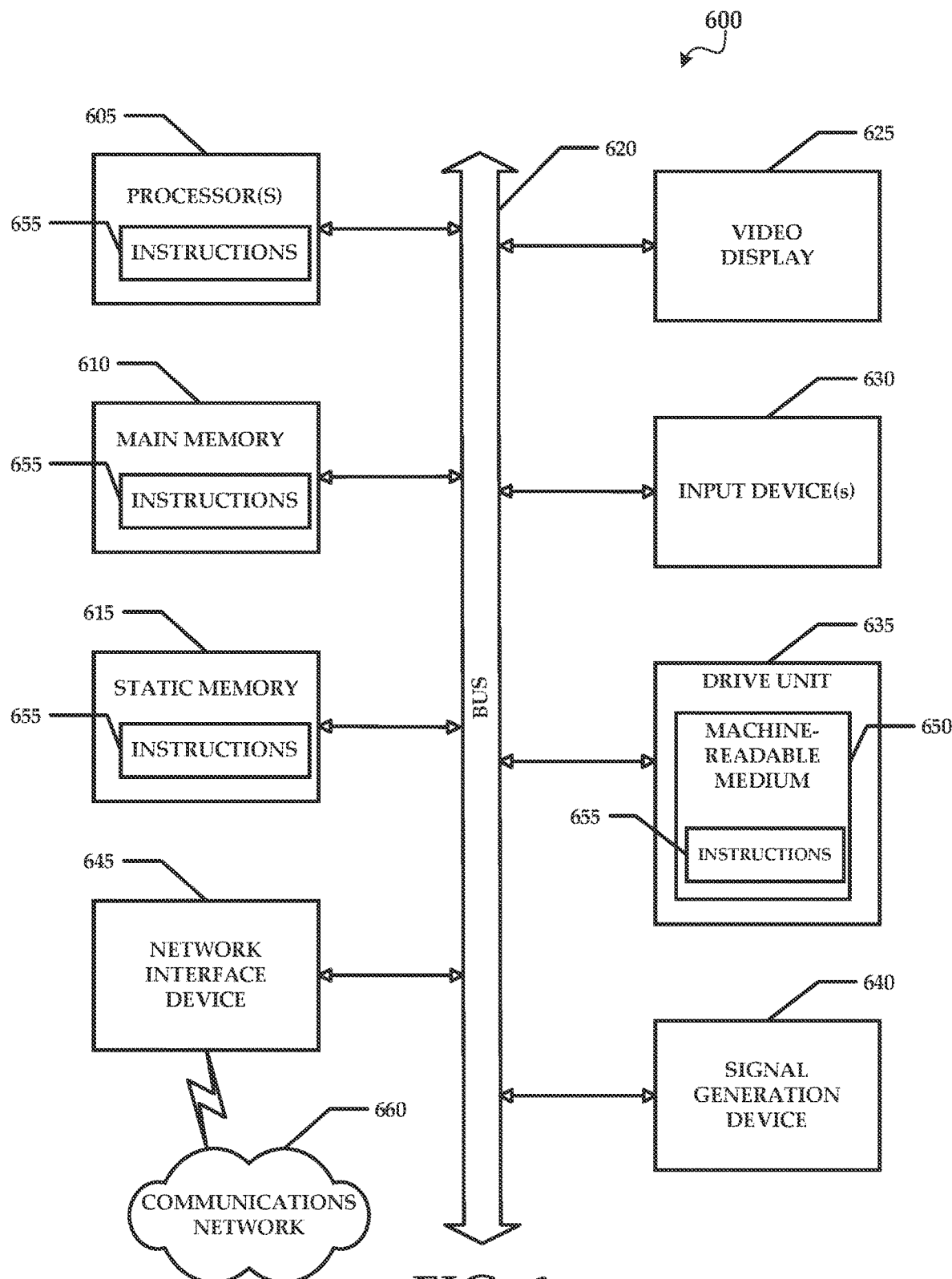
FIG. 6 is a diagrammatic representation of an example machine in the form of a computer system within which a set of instructions for the machine to perform any one or more of the methodologies discussed herein is executed.

FIG. 6 shows a diagrammatic representation of a computing device for a machine in the example electronic form of a computer system 600, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, game console, gaming device, set-top box (STB), television device, cellular telephone, portable music player (e.g., a portable hard drive audio device), web appliance, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein. Computer system 600 can be an instance of at least a console (see e.g. FIG. 1), game server 130, or UDS server 125, for example.

The example computer system 600 includes a processor or multiple processors 605 (e.g., a central processing unit (CPU), a graphics processing unit (GPU), or both), and a main memory 610 and a static memory 615, which communicate with each other via a bus 620. The computer system 600 can further include a video display unit 625 (e.g., a Liquid-Crystal Display (LCD)). The computer system 600 also includes at least one input device 630, such as an alphanumeric input device (e.g., a keyboard), a cursor control device (e.g., a mouse), a microphone, a digital camera, a video camera, and so forth. The computer system 600 also includes a disk drive unit 635, a signal generation device 640 (e.g., a speaker), and a network interface device 645.

The drive unit 635 (also referred to as the disk drive unit 635) includes a machine-readable medium 650 (also referred to as a computer-readable medium 650), which stores one or more sets of instructions and data structures (e.g., instructions 655) embodying or utilized by any one or more of the methodologies or functions described herein. The instructions 655 can also reside, completely or at least partially, within the main memory 610 and/or within the processor(s) 605 during execution thereof by the computer system 600. The main memory 610 and the processor(s) 605 also constitute machine-readable media.

The instructions 655 can be further transmitted or received over a communications network 660 via the network interface device 645 utilizing any one of a number of well-known transfer protocols (e.g., Hyper Text Transfer Protocol (HTTP), CAN, Serial, and Modbus). The communications network 660 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications network 660 can also include links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 650 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for cross-platform consumption of in-game objects has been disclosed herein. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for cross-platform consumption of in-game objects, the method comprising:
   receiving, by a data platform, from at least one first device, game object data discovered by a user while playing a video game associated with the data platform, the game object data being indicative of which in-game objects have been discovered by the user, the data platform having a data model being uniform across a plurality of application data structures;
   attributing, by the data platform, a cross-platform identifier to the game object data, the cross-platform identifier being associated with the user;
   storing, by the data platform, metadata associated with the game object data to a database associated with the data platform, the metadata indicative that the user has discovered one or more game objects;
   receiving, by the data platform from a second device associated with the data platform, a request for access to the game object data and the metadata, the request including the cross-platform identifier;
   authenticating, by the data platform, the request based on the cross-platform identifier;
   based on the authentication, selectively providing, by the data platform, access to game object data and the metadata, wherein the game object data may be consumed in an out-of-game environment; and
   generating and displaying, by the data platform, a user interface based on the game object data and the metadata, the user interface being customized based on which in-game objects the user has discovered.

2. The computer-implemented method of claim 1, further comprising the user interface having at least one game object that the user has discovered.

3. The computer-implemented method of claim 1, wherein the user interface is selectively filtered based on one or more of the following: a type of game object, a related in-game entity, a related in-game activity, a discovered status, a video game from which the game object is from, and an unviewed status.

4. The computer-implemented method of claim 1, wherein the user interface displays an at least one game object in a chronological order in which the at least one game object was discovered.

5. The computer-implemented method of claim 1, wherein the user interface includes a place holder for at least one game object that the user has not discovered.

6. The computer-implemented method of claim 1, wherein storing the metadata includes updating previously stored metadata with newly discovered information.

7. The computer-implemented method of claim 1, wherein metadata associated with one or more game objects is marked as always unlocked.

8. The computer-implemented method of claim 1, further comprising receiving a request for help regarding discovering a game object; and in response to receiving the request, launching a help system with the game object selected.

9. The computer-implemented method of claim 1, wherein the game object data is reviewed or consumed in a snap-mode, the snap-mode including a picture in picture, a dual screen, or a further device.

10. The computer-implemented method of claim 1, further comprising:

receiving a set of contextual information from a game client to a uniform data system server on the data platform; and providing the set of contextual information in a unified data model from the uniform data system server to a plurality of remote networked services.

11. A computer-implemented system for cross-platform consumption of in-game objects, the system comprising:

a data platform configured to:

receive from at least one first device, game object data discovered by a user while playing a video game associated with the data platform, the game object data being indicative of which in-game objects have been discovered by the user, the data platform having a data model being uniform across a plurality of application data structures;

attribute, a cross-platform identifier to the game object data, the cross-platform identifier being associated with the user;

store, metadata associated with the game object data to a database associated with the data platform, the metadata indicative that the user has discovered one or more game objects;

receive from a second device associated with the data platform, a request for access to the game object data and the metadata, the request including the cross-platform identifier;

authenticate, the request based on the cross-platform identifier; and based on the authentication, selectively provide, access to game object data and the metadata, wherein the game object data may be consumed in an out-of-game environment; and generate and display, a user interface based on the game object data and the metadata, the user interface being customized based on which in-game objects the user has discovered; and a database configured to store the metadata associated with the game object data.

12. The computer-implemented system of claim 11, wherein the one or more game objects include at least one of the following: a state of the video game, a progression of the video game, text, an image, a book, an audio book, an audiolog, and a video clip.

13. The computer-implemented system of claim 11, wherein the discovering of the game object data includes at least one of the following: encountering a new character or creature, collecting an artifact or item, identifying a weakness of an enemy, hearing information from a non-player character (NPC), watching a cut scene, progressing to a next stage of the video game, locating a previously undiscovered area, and choosing one of a plurality of story branches.

14. The computer-implemented system of claim 11, wherein the first device includes at least one of the following: a game console, a mobile device, a desktop computer, a laptop computer, a table, phablet, and a smart TV.

15. The computer-implemented system of claim 11, wherein the first device and the second device are the same device.

16. The computer-implemented system of claim 11, wherein the first device and the second device are different devices.

17. The computer-implemented system of claim 11, wherein the video game includes at least one of the following: a multiplayer game, a PvE game, and a cooperative PvE game; the game object data being discovered while interacting with a plurality of video games associated with the data platform.

18. The computer-implemented system of claim 11, wherein game object data is reviewed or consumed in a snap-mode.

19. The computer-implemented system of claim 18, wherein the snap-mode includes a picture in picture, a dual screen, or a further device.

20. The computer-implemented system of claim 11, further comprising:

receiving a set of contextual information from a game client to a uniform data system server on the data platform; and providing the set of contextual information in a unified data model from the uniform data system server to a plurality of remote networked services.

21. A non-transitory computer-readable storage medium having embodied thereon instructions, which when executed by a processor, perform steps of a method, the method comprising:

receiving, by a data platform, from at least one first device, game object data discovered by a user while playing a video game associated with the data platform, the game object data being indicative of which in-game objects have been discovered by the user, the data platform having a data model being uniform across a plurality of application data structures;

attributing, by the data platform, a cross-platform identifier to the game object data, the cross-platform identifier being associated with the user;

storing, by the data platform, metadata associated with the game object data to a database associated with the data platform, the metadata indicative that the user has discovered one or more game objects;

receiving, by the data platform from a second device associated with the data platform, a request for access to the game object data and the metadata, the request including the cross-platform identifier;

authenticating, by the data platform, the request based on the cross-platform identifier;

based on the authentication, selectively providing, by the data platform, access to game object data the metadata, wherein the game object data may be consumed in an out-of-game environment; and generating and displaying, by the data platform, a user interface based on the game object data and the metadata, the user interface being customized based on which in-game objects the user has discovered.

22. The method of claim 21, further comprising:

receiving a set of contextual information from a game client to a uniform data system server on the data platform; and providing the set of contextual information in a unified data model from the uniform data system server to a plurality of remote networked services.

* * * * *